United States Patent [19]

Salveson

[11] Patent Number: 5,038,982
[45] Date of Patent: Aug. 13, 1991

[54] SUPPORT UNIT IN AN AUTOMOBILE

[76] Inventor: Glen C. Salveson, 210 N. 20th St., Bismarck, N. Dak. 58501

[21] Appl. No.: 529,608

[22] Filed: May 29, 1990

[51] Int. Cl.⁵ .................................................. B60R 7/04
[52] U.S. Cl. ............................. 224/42.11; 224/42.42; 224/282; 220/23.86; 220/23.4; 248/101
[58] Field of Search .................. 224/42.11, 42.42, 282, 224/273, 275, 42, 45 R; 108/44; 296/37.1, 37.8, 37.12, 37.14, 37.9; 220/23.83, 23.86, 23.4; 248/101

[56] References Cited

U.S. PATENT DOCUMENTS

| 2,112,471 | 3/1938 | Sevelle | 296/37.12 X |
| 2,965,344 | 12/1960 | Baker | 248/101 |
| 3,261,545 | 7/1966 | Frazier | 248/101 |
| 3,311,276 | 3/1967 | Fromm | 224/42.11 X |
| 3,561,589 | 2/1971 | Larkin, Jr. et al. | 224/42.11 |
| 4,087,126 | 3/1978 | Wynn | 296/37.8 |
| 4,106,829 | 8/1978 | Dolle | 312/235.2 |
| 4,143,800 | 3/1979 | McCaffrey | 224/42.42 |
| 4,294,384 | 10/1981 | Howell | 224/42.42 |
| 4,643,342 | 2/1987 | Borelli | 224/42.42 |
| 4,796,791 | 1/1989 | Goss | 224/275 |
| 4,809,897 | 3/1989 | Wright | 224/282 |
| 4,821,931 | 4/1989 | Johnson | 224/42.42 |
| 4,832,241 | 5/1989 | Radcliffe | 224/275 |
| 4,913,318 | 4/1990 | Forrester | 224/42.42 X |
| 4,915,275 | 4/1990 | Brown | 224/42.42 |
| 4,942,990 | 7/1990 | White | 224/42.42 |

FOREIGN PATENT DOCUMENTS 0966890 4/1975 Canada .................................. 108/44

Primary Examiner—Henry J. Recla
Assistant Examiner—Casey Jacyna

[57] ABSTRACT

An accessory for disposition in an automotive vehicle to support a disposable trash bag, a liquid-containment bottle, and two drinking cups. The trash bag is suspended from a platform that is located below a liftable clamp plate; the plate exerts a clamping pressure on the upper edge areas of the trash bag to retain it in a suspended position. The liquid containment bottle is located equidistantly from the two drinking cups such that the bottle can be swiveled around its central axis to orient a discharge spout above either drinking cup for pouring purposes.

7 Claims, 2 Drawing Sheets

SUPPORT UNIT IN AN AUTOMOBILE

BACKGROUND AND SUMMARY OF THE INVENTION

This invention relates to an accessory that is usable in an automotive vehicle for holding a standard two quart air pot for hot or cold liquids (e.g. coffee or iced tea), and two small drinking cups. The accessory further has a small opening therein for holding an ash tray, and a somewhat larger opening for suspending a flexible trash bag below the ash tray. The ash tray can be temporarily removed from its opening to deposit trash into the suspended trash bag. Sufficient space is provided to accommodate a reasonably sized trash bag.

The accessory is adapted to be mounted over a longitudinally extending tunnel in the floor of a vehicle, between the driver space and the passenger space. The accessory uses space that is otherwise vacant and thus not fully utilized.

I am aware that others have proposed accessory devices somewhat similar in general purpose to my accessory device. See for example U.S. Pat. No. 4,106,829 to Dolle et al, U.S. Pat. No. 4,643,342 to F. Borelli, U.S. Pat. No. 4,796,791 to R. Goss, and U.S. Pat. No. 4,832,241 to D. Radcliffe. None of these patents is believed to disclose an accessory adapted for diposition over the tunnel area of a vechile, in the manner contemplated by my invention. Also, none of these patents is believed to teach a construction adapted to hold a trash bag in a suspended position beneath an ash tray opening, in the manner contemplated by my invention.

THE DRAWINGS

DESCRIPTION OF A PREFERRED EMBODIMENT OF THE INVENTION

Figure 1:
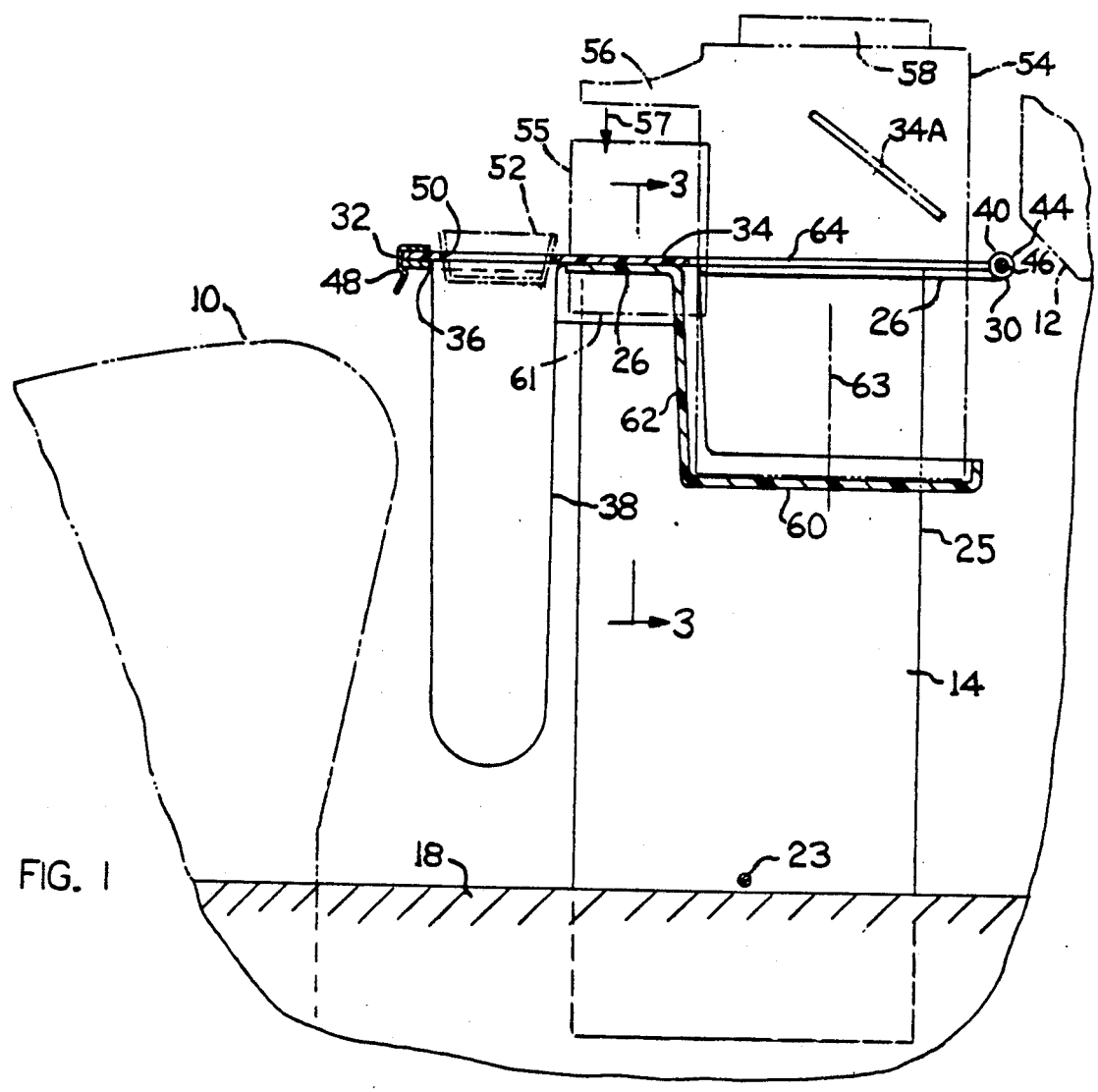
FIG. 1 is a longitudinal sectional view taken through an accessory device constructed according to the invention.
Figure 2:
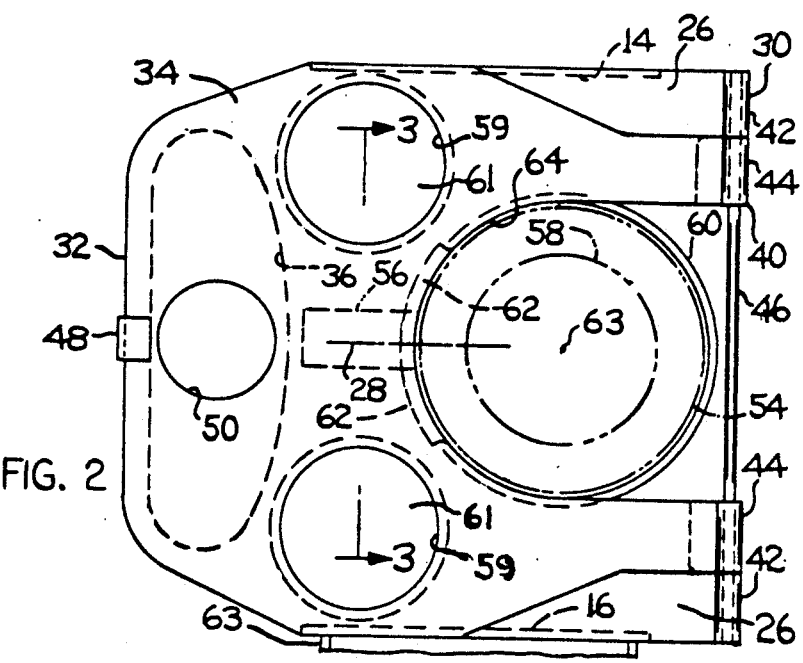
FIG. 2 is a top plan view of the FIG. 1 device.
Figure 3:
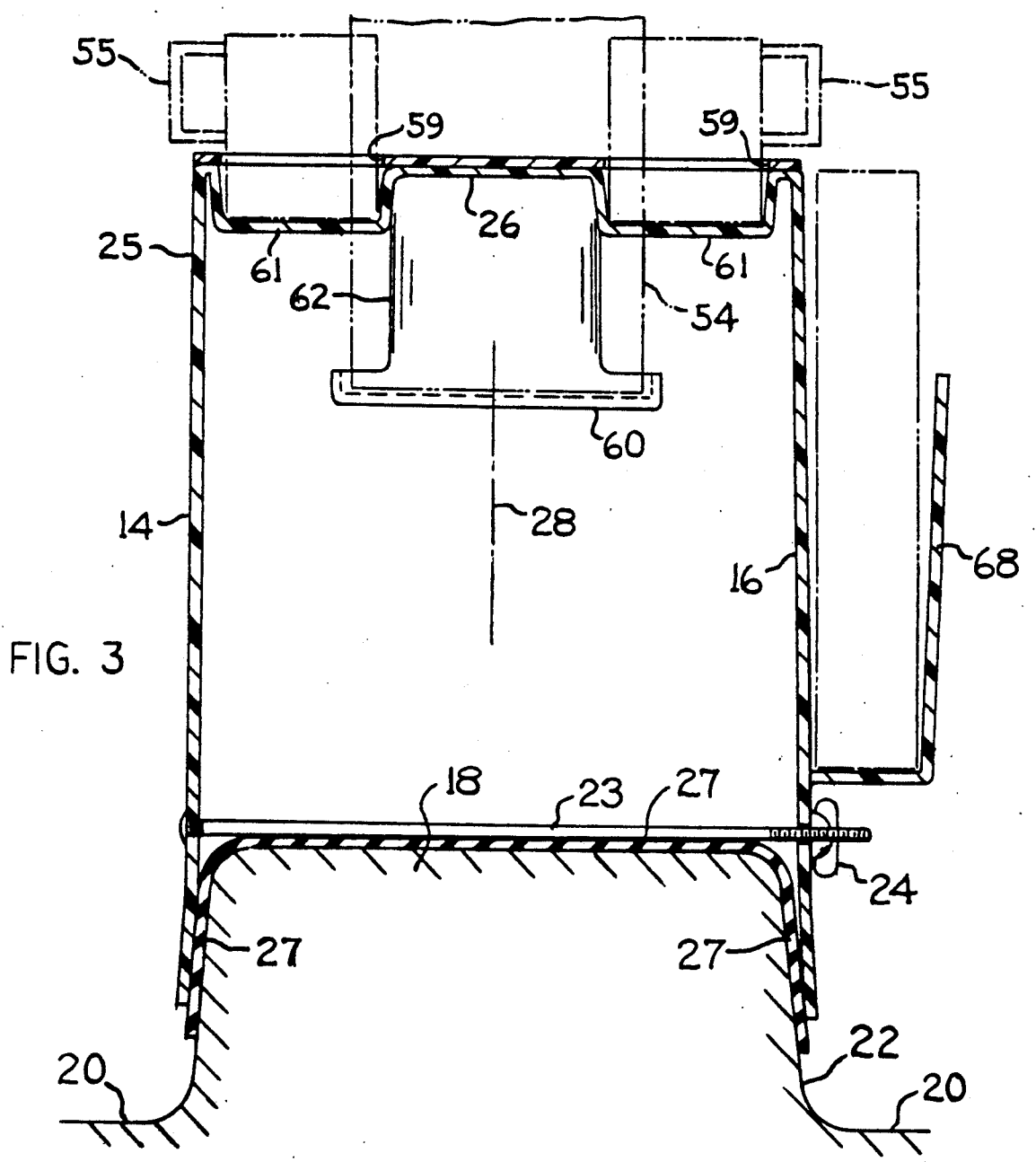
FIG. 3 is a transverse sectional view taken on line 3—3 in FIGS. 1 and 2.

FIGS. 1 through 3 show an accessory device adapted for removable disposition in an automotive vehicle between the vehicle front seat 10 and the vehicle dashboard 12. The device is installed generally on the longitudinal centerline of the vehicle midway between the driver space and the passenger space. As shown best in FIG. 3 the accessory device is positioned so that two laterally-spaced legs (walls) 14 and 16 of the device have their lower end areas straddling a tunnel structure 18 that forms part of a vehicle floor 20.

In a typical vehicle, tunnel structure 18 will have a transverse width of about seven inches and a height of about four inches. Usually the side walls 22 of the tunnel structure are convergent slightly toward each other in the upward direction, as indicated in FIG. 3. The transverse width dimension of the tunnel structure can vary from one vehicle to another vehicle. To compensate for such variations the accessory device can be manufactured so that the lower ends of leg walls 14 and 16 are adjustable toward or away from each other. A tie rod 23 and wing nut 24 can be utilized to locate the two leg walls in gripment against side surfaces of tunnel structure 18. Also, a deformable rubber pad 27 can be interposed between the accessory device and the surface of tunnel structure 18; small rubber spikes on the pad undersurface interlock with the rug fibers to hold the accessory device in a fixed position.

Leg walls 14 and 16 form parts of a hollow U shaped base 25. As seen best in FIG. 3 leg walls 14 and 16 extend downwardly from a horizontal platform wall 26. Walls 14 and 16 are spaced equidistantly from the longitudinal centerline 28 of the hollow base, such that platform wall 26 is located substantially directly above tunnel structure 18.

Platform wall 26 has a generally flat horizontal upper surface extending longitudinally between a first transverse edge 30 and a second transverse edge 32. As seen in FIG. 1, transverse edge 30 is located in near proximity to the protruding portion of vehicle dashboard 12, and transverse edge 32 is located a slight distance above the forward portion of the vehicle front seat 10. The driver and front seat passenger have hand access to the accessory device.

The accessory device comprises an essentially flat plate 34 normally overlying base 25 so that the lower face of plate 34 is in contact with the upper face of platform wall 26. As seen best in FIG. 2, wall 26 has a transversely elongated opening 36 extending therethrough. A conventional flexible plastic trash bag 38 can be positioned within opening 36 so that upper edge portions of the bag lie on the upper face of wall 26, with the bag extending downwardly through opening 36. Plate 34 exerts a clamping force on upper edge portions of the bag to prevent the bag from slipping down through opening 36, especially when the bag is loaded with trash.

In order to install or remove bag 36, it is necessary to lift clamp plate 34 away from the platform wall 26. The clamp plate and platform wall 26 are hingedly connected together by means of a hinge structure 40 located at transverse edge 30 of wall 26. The hinge structure can be varied as to structural detail and configuration. As shown in FIG. 2, the hinge structure comprises two hinge knuckles 42 carried on wall 26, and two cooperating hinge knuckles 44 carried on plate 34. An elongated pin 46 extends through the aligned knuckles to form a swingable connection between plate 34 and wall 26. Numeral 34a in FIG. 1 fragmentarily shows plate 34 in a swing-up position suitable for installing or removing tash bag 38.

A spring detent 48 can be carried on plate 34 to releasably hold the plate against platform wall 26. The detent will eliminate any undesired rattling and also ensure that plate 26 will exert the desired clamp force on edge portions of bag 38 lying on the surface of wall 26 surrounding opening 36. Plate 34 is formed with a small circular hole 50 therethrough for placement of trash into the suspended bag 38 (when plate 34 is in portion on wall 26). An ash tray 52 (FIG. 1) can be removably supported in hole 50 if so desired. If an ash tray is used, it must be removed in order to place trash into bag 38.

The accessory device has structure thereon for supporting a two quart liquid containment bottle 54 and two small drinking cups 55. Bottle 54 is preferably an insulated bottles structure formed of plastic material and having a liquid discharge spout 56 adapted to discharge liquid downwardly, as indicated by directional arrow 57 in FIG. 1. The bottle can be an air pot (pump pot) structure having a manually depressible plunger 58 for pressurizing the space above the liquid when the plunger is manually depressed.

Bottle 54 is supported on a horizontal ledge 60 that is rigidly connected to platform wall 26 via a vertical wall 62. The overlying plate 34 has an enlarged opening 64 therethrough for receiving the bottle.

It will be noted from FIG. 1 that the drinking cup 55 is supported so that its upper edge is below the level of spout 56 on bottle 54. Each cup 55 extends downwardly through a circular opening 59 in plate 34. As seen in FIG. 3, each cup is supported on a downwardly-recessed support surface 61 formed as part of platform wall 26.

Each circular opening 59 is located the same distance from the central axis 63 of bottle-reception opening 64 and bottle-support ledge 60. The bottle can be swiveled around its axis so that its spout 56 is directly above either one of cups 55. Plunger 58 can then be manually depressed to pump liquid from the bottle into the respective cup 55. It is not necessary to remove the bottle or tilt it in order to discharge liquid through spout 56 into the subjacent cup 55. The action of plunger 58 pressurizes the air space within the bottle to produce a liquid pumping action.

As an added feature, the base 25 can include an upwardly open pocket structure 68 (FIG. 3) adapted to receive therein a box of facial tissues, e.g. tissues sold under the trademark Kleenex. Other pocket structures and compartments (not shown) can be included in base 25 for containment of such items as pens, eyeglasses, maps, and note pads.

The drawings necessarily show a specific structural form of the invention. It will be appreciated that the invention can be practiced in other forms and configurations.

I claim:

1. An accessory for use in an automotive vehicle, comprising: a hollow base that includes a horizontal platform wall locatable directly over a centrally located tunnel in the floor of a vehicle, and two spaced leg walls extending downwardly from said platform wall so that their lower ends straddle side surfaces of the tunnel;

said hollow base having a longitudinal vertical centerline extending midway between said spaced leg walls substantially directly above the centerline of the tunnel;

said platform wall having a first transverse edge locatable in near proximity to a lower surface of the vehicle dashboard, and a second transverse edge locatable substantially directly above a forward portion of a vehicle front seat;

a clamp plate overlying said platform wall; hinge means swingably connecting said clamp plate to the first transverse edge of the platform wall, whereby the clamp plate is adapted to be swung upwardly to expose the platform wall;

said platform wall having a transversely elongated bag-reception opening therethrough adjacent its second transverse edge; said transverse opening defining a surrounding wall surface adapted to suspend a flexible trash bag hanging downwardly through the transverse opening; said clamp plate being adapted to engage edge portions of the bag lying on said surrounding wall surface, to thereby prevent the bag from slipping through the transverse opening; said clamp plate having a trash-accommodation hole therethrough registerable with the transverse opening for placement of trash into the suspended bag;

a relatively large bottle-reception opening in said clamp plate adapted to receive a liquid-containment bottle; and two relatively small cup-reception openings in said clamp plate; said bottle-reception opening being located on the aforementioned centerline, and said cup-reception openings being located outboard from the centerline between the bottle-reception opening and the bag-reception opening.

2. The acessory of claim 1, wherein said trash-accommodation hole is a circular hole adapted to removably receive an ash tray.

3. The accessory of claim 2, wherein said circular hole has a diameter that is less than the dimension of the bag-reception opening measured along said vertical centerline.

4. The accessory of claim 1, and further comprising means extending between the two leg walls whereby said leg walls are enabled to exert gripper forces on the tunnel wall.

5. The accessory of claim 1, wherein said platform wall has a downwardly-recessed support area (60) located directly below the bottle-reception opening in the clamp plate, whereby the associated bottle is seated on the subadjacent support area.

6. The accessory of claim 5, wherein said platform wall has two other downwardly-recessed support areas (61) located directly below the cup-reception openings in the clamp plate, whereby the associated cups are seatable on said other support areas.

7. The accessory of claim 1, wherein the cup-reception openings are located equidistant from said bottle-reception opening; the spacing between the bottle-reception opening and the two cup-reception openings being such that the bottle can be swiveled in its opening to pour into either one of the cups without removing the bottle or the cups from their associated openings.

* * * * *